United States Patent
Xu et al.

(10) Patent No.: US 11,509,459 B2
(45) Date of Patent: Nov. 22, 2022

(54) SECURE AND ROBUST DECENTRALIZED LEDGER BASED DATA MANAGEMENT

(71) Applicant: Conduent Business Services, LLC, Florham Park, NJ (US)

(72) Inventors: Lei Xu, Cary, NC (US); Isaac Manny Markus Serfaty, Morrisville, NC (US)

(73) Assignee: Conduent Business Services, LLC, Florham Park, NJ (US)

( * ) Notice: Subject to any disclaimer, the term of this patent is extended or adjusted under 35 U.S.C. 154(b) by 533 days.

(21) Appl. No.: 16/409,697

(22) Filed: May 10, 2019

(65) Prior Publication Data

US 2020/0358600 A1 Nov. 12, 2020

(51) Int. Cl.
| | |
|---|---|
| H04L 29/06 | (2006.01) |
| H04L 9/08 | (2006.01) |
| H04L 9/06 | (2006.01) |
| H04L 9/32 | (2006.01) |

(52) U.S. Cl.
CPC ............ *H04L 9/085* (2013.01); *H04L 9/0618* (2013.01); *H04L 9/3231* (2013.01); *H04L 9/3255* (2013.01)

(58) Field of Classification Search
CPC ..... H04L 9/085; H04L 9/0618; H04L 9/3231; H04L 9/3255; H04L 63/12; H04L 2209/56; H04L 9/3239
See application file for complete search history.

(56) References Cited

U.S. PATENT DOCUMENTS

| | | | |
|---|---|---|---|
| 5,369,702 A | 11/1994 | Shanton | |
| 5,719,938 A | 2/1998 | Haas et al. | |
| 6,411,716 B1* | 6/2002 | Brickell | G06F 21/40 |
| | | | 713/180 |
| 8,856,530 B2 | 10/2014 | Patti et al. | |
| 2014/0047513 A1 | 2/2014 | van 't Noordende | |
| 2014/0310527 A1* | 10/2014 | Veugen | H04L 9/0825 |
| | | | 713/150 |

(Continued)

OTHER PUBLICATIONS

Zyskind, Guy, and Oz Nathan. "Decentralizing privacy: Using blockchain to protect personal data." Security and Privacy Workshops (SPW), 2015 IEEE. IEEE, 2015.

(Continued)

*Primary Examiner* — Harunur Rashid
(74) *Attorney, Agent, or Firm* — Ortiz & Lopez, PLLC; Kermit D. Lopez; Luis M. Ortiz

(57) ABSTRACT

Systems and methods providing access control and data privacy/security with decentralized ledger technology are disclosed. To ensure data privacy the decryption or access to data by a non-data owner requires joint orchestration of decentralized system nodes to provide partial decryption components with n-of-x required to fulfill request. Data can be encrypted, and access control policy can be decided including required number of key fragments to fulfill decryption. Access control policies can be stored in the decentralized ledger based system. Key information can be stored in the system in a decentralized manner with partial key fragments encrypted and split among system nodes. An access request can be sent to the system to fetch a data file, without disclosing the requester's identity in the system. The decentralized ledger based system can verify a legitimate request to access the data and denies access to malicious or faulty participants.

3 Claims, 8 Drawing Sheets

(56) References Cited

U.S. PATENT DOCUMENTS

| | | | |
|---|---|---|---|
| 2015/0288762 A1 | 10/2015 | Ito et al. | |
| 2016/0212109 A1* | 7/2016 | Hird | H04L 63/062 |
| 2018/0053009 A1* | 2/2018 | Claes | H04L 9/0894 |
| 2018/0143826 A1* | 5/2018 | Crabtree | G06F 8/77 |
| 2018/0270065 A1* | 9/2018 | Brown | H04L 9/3239 |
| 2019/0342084 A1* | 11/2019 | Mehedy | H04L 9/0643 |
| 2020/0082117 A1* | 3/2020 | Simmons | H04L 63/105 |
| 2020/0160319 A1* | 5/2020 | Smith | H04L 63/102 |
| 2020/0211305 A1* | 7/2020 | Bender | G06N 20/00 |
| 2021/0182423 A1* | 6/2021 | Padmanabhan | G06F 21/64 |
| 2021/0319436 A1* | 10/2021 | Ow | G06Q 20/367 |

OTHER PUBLICATIONS

Ouaddah, Aafaf, Anas Abou Elkalam, and Abdellah Ait Ouahman. "FairAccess: a new Blockchain-based access control framework for the Internet of Things." Security and Communication Networks 9.18 (2016): 5943-5964. https://onlinelibrary.wiley.com/doi/epdf/10.1002/sec.1748.

Ouaddah, Aafaf, Anas Abou Elkalam, and Abdellah Ait Ouahman. "Towards a novel privacy-preserving access control model based on blockchain technology in IoT." Europe and MENA Cooperation Advances in Information and Communication Technologies. Springer, Cham, 2017. 523-533. https://www.researchgate.net/publication/308567618_Towards_a_Novel_Privacy-Preserving_Access_Control_Model_Based_on_Blockchain_Technology_in_IoT.

Maesa, Damiano Di Francesco, Paolo Mori, and Laura Ricci. "Blockchain based access control." IFIP International Conference on Distributed Applications and Interoperable Systems. Springer, Cham, 2017. https://www.researchgate.net/publication/318018529_Blockchain_Based_Access_Control.

* cited by examiner

SECURE AND ROBUST DECENTRALIZED LEDGER BASED DATA MANAGEMENT

TECHNICAL FIELD

The embodiments are generally related to decentralized ledgers. Embodiments are also generally related to secure access to decentralized ledger based data. More particularly, embodiments are related to systems and method for securing and managing decentralized ledger based data including access control.

BACKGROUND

A decentralized ledger is an electronic data structure that is maintained by multiple participants, without relying on any centralized party, and various applications can be developed on top of it. This relate to what is commonly referred to as "Blockchain" technology. As many applications need to interact with data, it is important to develop an access control mechanism that is fully compatible with this decentralized ledger environment.

Decentralized ledgers have various applications related to and requiring data processing and storage. The decentralization feature, however, raises several security concerns since many established security protection mechanisms are not compatible with a decentralized environment.

Access control is the most deployed security technology to protect data and provide for its security. Although there are different ways to define access policies and implement enforcement, all previous approaches rely on a centralized party. Decentralization of data in ledgers brings new challenges, e.g., information stored on the ledger is generally accessible to every participant and may result in the leak of information, and some participants of a distributed data system can be malicious or negligent in their protection of data and control over its access.

What are needed are access control mechanisms that are compatible with a decentralized ledger environment.

SUMMARY OF EMBODIMENTS

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide methods and systems that achieve access control within decentralized ledger technology.

It is a feature of the embodiments of the present invention provides an access control mechanism that leverages decentralized ledger features, and which can allow a user to define customized access policies and enables a decentralized ledger to enforce these policies in a privacy preserving way for an original document and subsequent edits.

The usefulness of the embodiments of the invention consists of two features: (i) as an independent system, the disclosed embodiments provide a new application of decentralized ledger with desirable features; (ii) as a component of other decentralized ledger based applications, the disclosed embodiments provide a critical security service. To ensure data privacy the decryption or access to data by a non-data owner requires joint orchestration of decentralized system nodes to provide partial decryption components with n-of-x required to fulfill request.

It is a feature to provide a systems and method to achieve and manage access control with decentralized ledger technology. Accordingly, to ensure data privacy the decryption or access to data by a non-data owner joint orchestration of decentralized system nodes can be utilized to provide partial decryption components with n-of-x required to fulfill request. Data can be encrypted, and access control policy is decided including required number of key fragments to fulfill decryption. Access control policies can be stored in the decentralized ledger based system. Key information can be stored in the system in a decentralized manner with partial key fragments encrypted and split among system nodes. An access request can be sent to the system to fetch a data file, without disclosing the requester's identity in the system. The decentralized ledger based system can verify a legitimate request to access the data and can detect malicious/faulty attempts to access data and denies access to data by malicious or faulty participants.

Embodiments of the invention can includes the steps where: data can be encrypted, and access control policy can be decided including required number of key fragments to fulfill decryption; encrypted data, access control policies are stored in the proposed decentralized ledger based system; key information is stored in the proposed system in a decentralized manner with partial key fragments encrypted and split among system nodes; an access request can be sent to the system to fetch a data file, without disclosing the requester's identity in the system. The decentralized ledger based system can verify the request and help the user with a legitimate request to access the data. In this process, malicious/faulty participants of the system can be detected. The provision of the partial keys by network nodes can be, but are ideally, signed by individual keys and can be extended to include additional established security features such as two-step authentication, biometric information, or hardware token provision.

In accordance with a method for access control, data can be encrypted for distribution to a decentralized ledger comprised of system nodes, an access control policy can be determined that includes a required number of key fragments to fulfill decryption of the data, encrypted data and access control policies can be stored in the decentralized ledger, and key information can be stored as partial key fragments in a decentralized manner among the system nodes.

In accordance with another aspect of the disclosed method for access control, receive an access request at the distributed ledger to fetch a data file without disclosing requester identity, verify the access request at the decentralized ledger as a legitimate request or as a malicious/faulty request, and assist a user of a legitimate request to access the data and deny access to malicious/faulty requests.

Benefits of the present embodiment include that the command and control functions are distributed across several participants for user authentication, leading to a higher level of trust and fault tolerance. By using partial keys, full disclosure of the identifying credentials is not needed for any single participant allowing the user to retain anonymous while gaining access. This decreases the risk to identity data and the liability associated with it being compromised by malicious actors. Also, the decentralized architecture creates no single point of failure and allows for rapid downtime recovery.

The aforementioned aspects and other objectives and advantages can now be achieved as described herein.

BRIEF DESCRIPTION OF DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
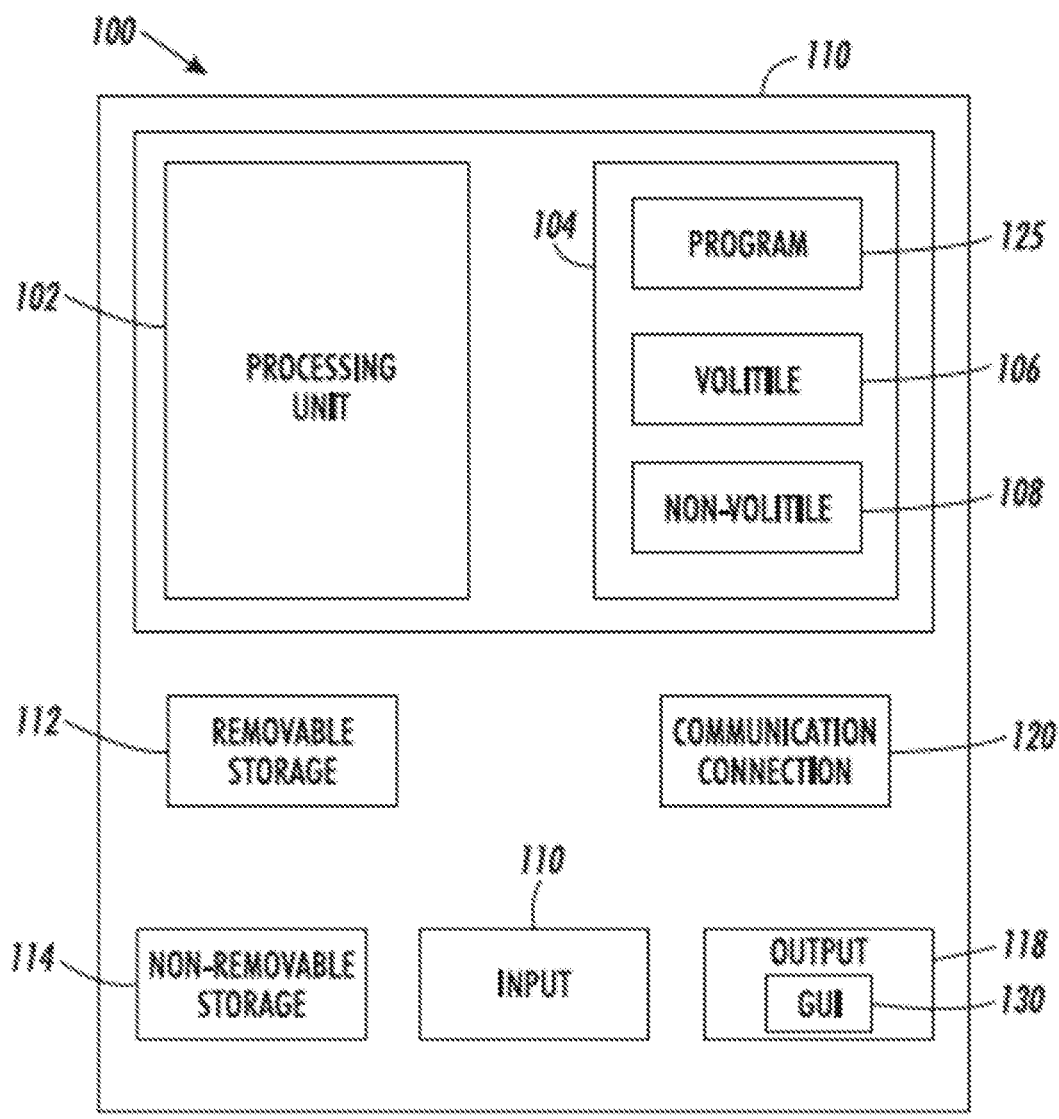
FIGS. 1-3 illustrates data processing and networking environments in which embodiments of the present invention may be implemented.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 2:
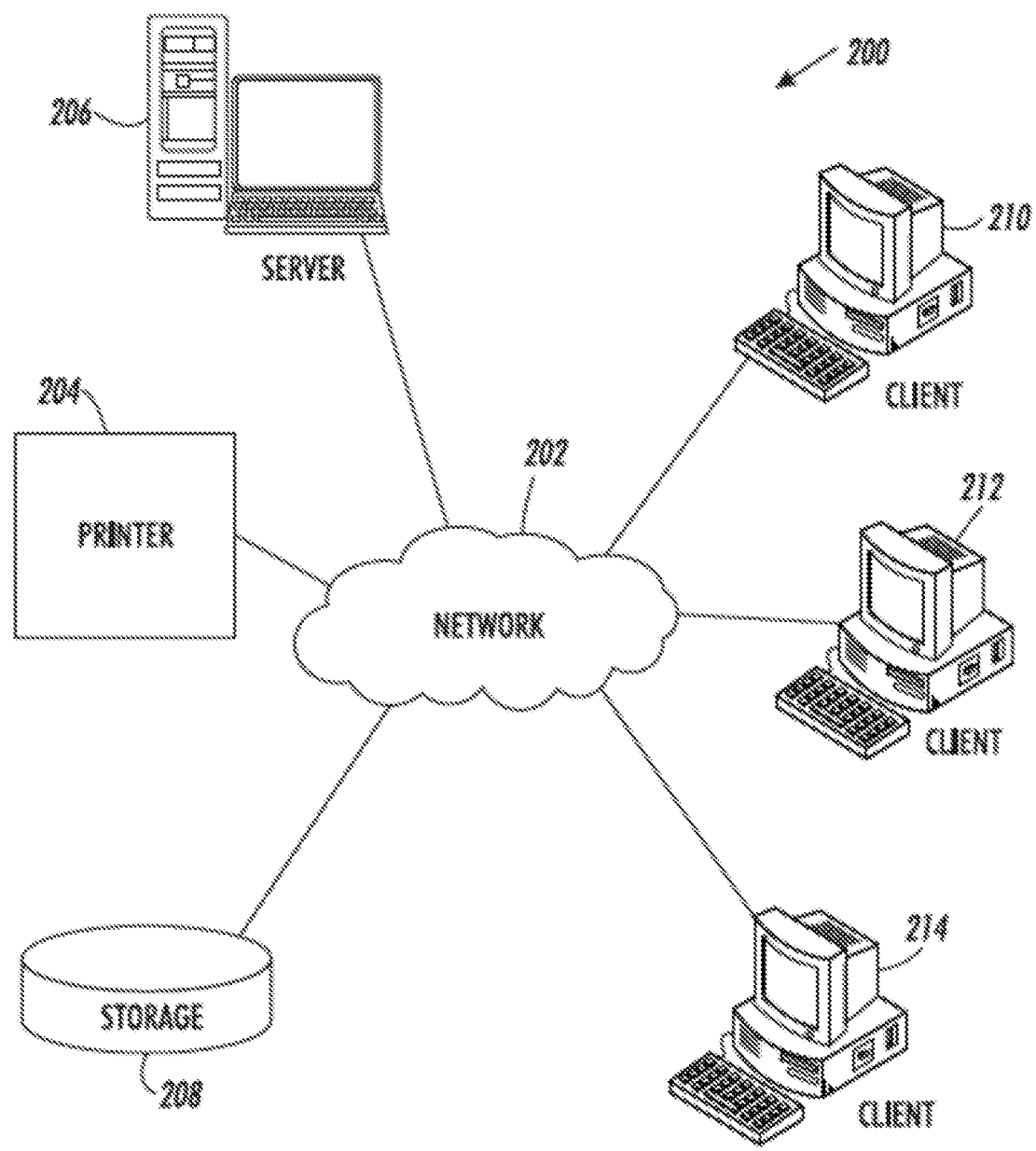
Figure 3:
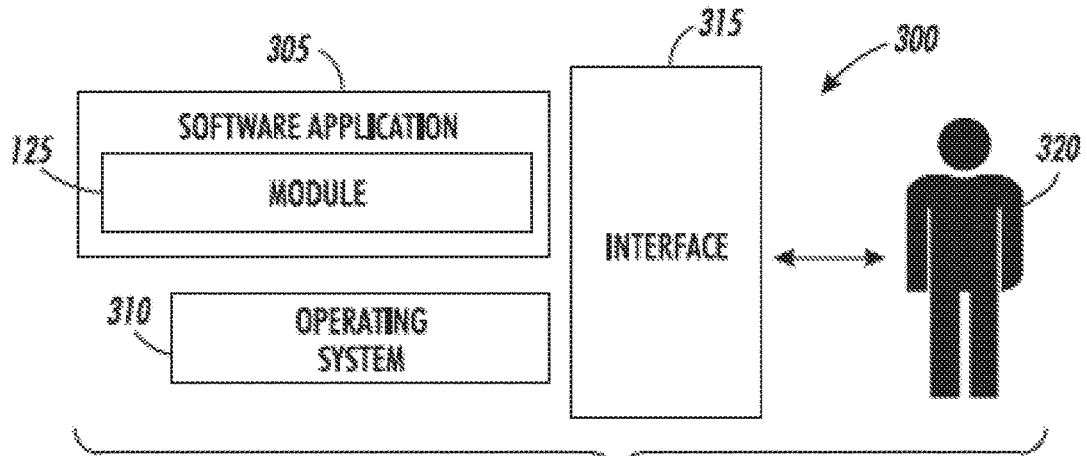

FIGS. 1-3 are provided as exemplary diagrams of data processing and networking environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that can execute programming for implementing parts of the methods and systems disclosed herein is shown in FIG. 1. A computing device in the form of a computer 110 configured to interface with controllers, peripheral devices, and other elements disclosed herein can include one or more processing units 102, memory 104, removable storage 112, and non-removable storage 114. Memory 104 can include volatile memory 106 and non-volatile memory 108. Computer 110 can include or have access to a computing environment that includes a variety of transitory and non-transitory computer-readable media such as volatile memory 106 and non-volatile memory 108, removable storage 112 and non-removable storage 114. Computer storage as described herein can include, for example, disc storage, disk storage, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Discs (DVD) or other optical disc storage, magnetic cassettes, magnetic tape, magnetic disk storage, or other magnetic storage devices, or any other medium capable of storing computer-readable instructions as well as data including image data.

Computer 110 can include, or have access to, a computing environment that includes input 116, output 118, and a communication connection 120. The computer can operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer can also include a personal computer (PC), server, router, network PC, RFID enabled device, a peer device or other common network node, or the like. The communication connection 120 may include a Local Area Network (LAN), a Wide Area Network (WAN), Bluetooth connection, or other networks. This functionality is described more fully in the description associated with FIG. 2 below.

Output 118 is most commonly provided as a computer monitor, but can include any output device. Output 118 and/or input 116 can include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 can function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device, such as input 116 which can be embodied, for example, as a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, can be stored on a computer-readable medium and can be executable by the processing unit 102 of computer 110. Program module or node 125 can include a computer application to carry out (execute) processes of accessing and managing a decentralized ledger based access control system to include any of accessing, storing and manipulating data. A hard drive, CD-ROM, RAM, Flash Memory, and a USB drive are just some examples of articles including a computer-readable medium.

FIG. 2 depicts a graphical representation of a network of data-processing systems 200 in which aspects of the present invention can be implemented. A network of data-processing system 200 can be a network of computers or other such devices, such as mobile phones, smart phones, wearable computer such as computer-enabled goggles and glasses, sensors, controllers, speakers, tactile devices, and the like, in which embodiments of the present invention can be implemented. Note that the system data-processing system 200 can be implemented in the context of a software module, such as module 125. The data-processing system 200 includes a network 202 in communication with one or more clients 210, 212, and 214. Network 202 can also be in communication with one or more printing devices 204, servers 206, and storage 208. Network 202 is a medium that can be used to provide communications links between various devices and computers connected together within a networked data processing system such as computer system 100, as well as distributed ledger-based systems. Network 202 can include connections such as wired communication links, wireless communication links of various types, and fiber optic cables. Network 202 can communicate with one or more servers 206, one or more external devices such as multifunction device or printer 204, and storage 208, such as a memory storage unit, for example, a memory or database. It should be understood that printing device 204 may be embodied as a printer, copier, fax machine, scanner, multi-function device, rendering machine, photo-copying machine, or other such rendering device.

In the depicted example, printer 204, server 206, and clients 210, 212, and 214 connect to network 202 along with storage 208. Clients 210, 212, and 214 may be, for example, personal computers or network computers, handheld devices, mobile devices, tablet devices, smart phones, personal digital assistants, wearable computers including head-mounted displays such as goggles and glasses, printing devices, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and printing device 204 are clients to server 206 in this example. Network data-processing system 200 can include additional servers, clients, and other devices not shown. Specifically, clients can connect to any member of a network of servers, which provide equivalent content.

In the depicted example, the network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 can also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which can be employed for directing the operation of the data-processing systems such as computer system 100 depicted in FIG. 1. Software application 305, can be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the computer system 100. The computer system 100 can receive user commands and data through interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein can refer to a collection of routines and data structures that perform a particular task or implement a particular abstract data type. Modules can be composed of two parts: an interface, which lists the constants, data types, variables, and routines that can be accessed by other modules or routines; and an implementation, which is typically private (accessible only to that module) and which includes source code that actually implements the routines in the module. The term module can also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" type system, such as Microsoft Windows®. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

Figure 4:
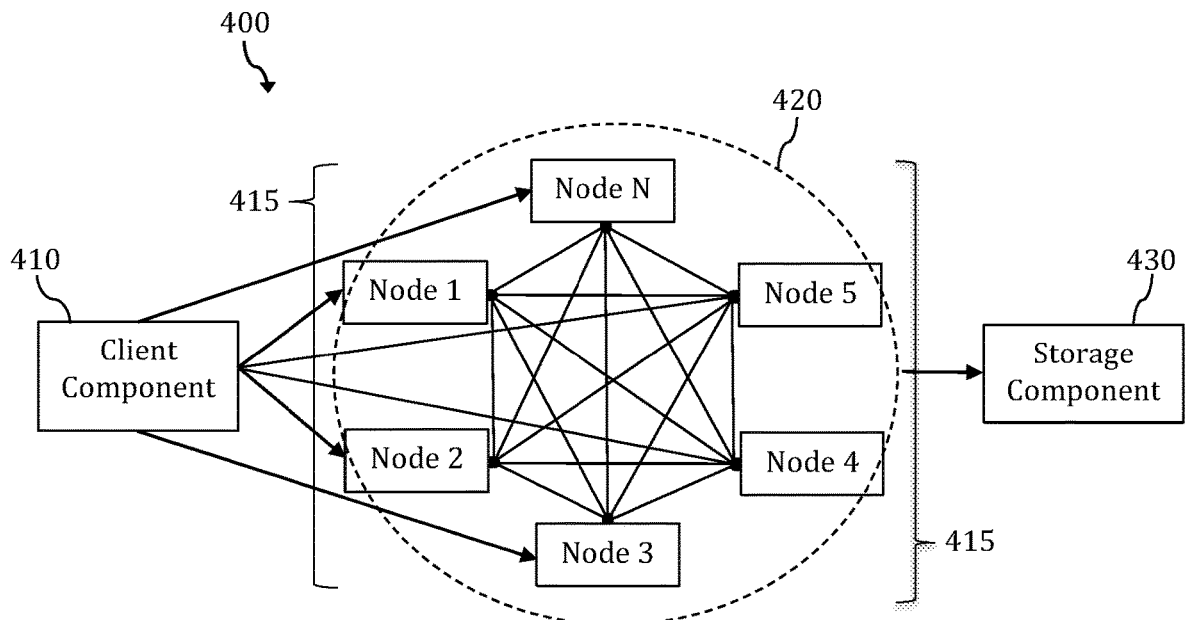
FIG. 4 illustrates a block diagram of a decentralized ledger based access control system, in accordance with the embodiments.

Referring to FIG. 4, an overview of a decentralized ledger based access control environment 400 is described. A client component 410 can interact with the decentralized ledger 415 via n access control component 420 that can be associated with the decentralized ledger 415. A storage component 430 can be provided for data storage and enabling access control services. The access control component 420 can manage, and assist in, enforcement of access control policies that can be created by the client component 410. The storage component 430 can follow instructions of the access control component 420 to operate data files under management.

Client Component.

Figure 5:
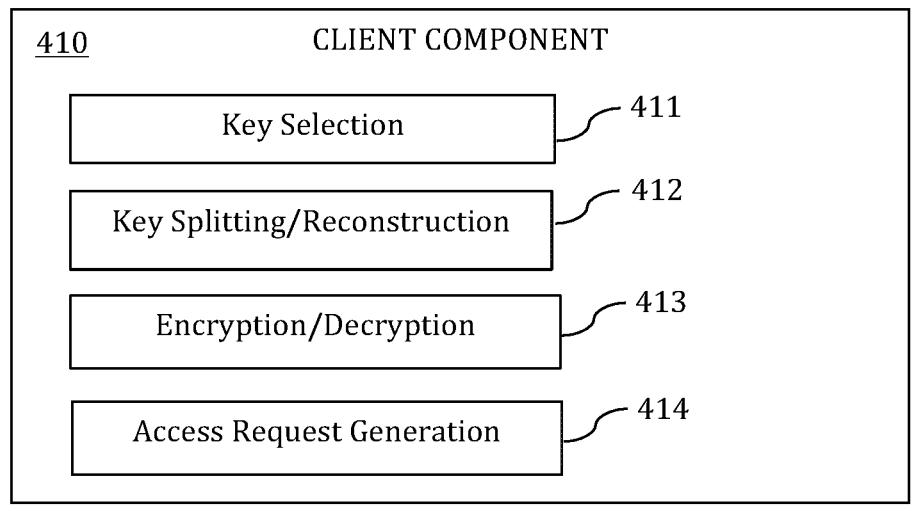
FIG. 5 illustrates of a client component as part of a decentralized ledger based access control system, in accordance with the embodiments.

Referring to FIG. 5, a client component 410 can include the following modules: A key selection module 411, which can randomly select a symmetric key; and a key splitting/reconstruction module 412 can split a symmetric key into multiple pieces (partial keys) and reconstruct the original symmetric key from a subset or all partial keys. This module is also able to verify whether a partial key is valid. An encryption/decryption module 413 can encrypt/decrypt data files and different keys. An access request generation module 414, can generate an access request in a privacy preserving way, i.e., the client does not need to disclose its own identity in the request. A client component 410 can send/receive data to/from the other two components (i.e., the access control component 420 and the storage component 430).

Access Control Component.

Figure 6:
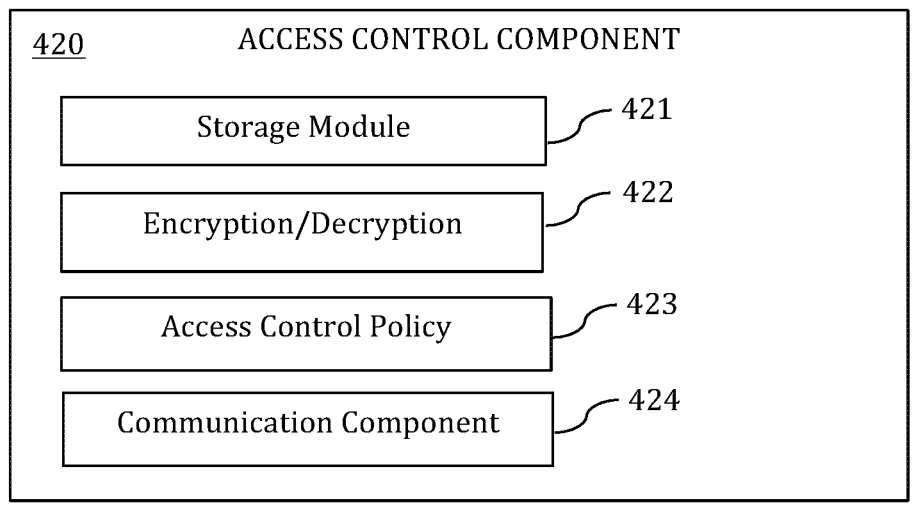
FIG. 6 illustrates of an access control component as part of a decentralized ledger based access control system, in accordance with the embodiments.

Referring to FIG. 6, a decentralized Ledger based access control component 420 can include a group of devices, and each device can have the following modules: The storage module 421, which can stores its own copy of the decentralized ledger. An encryption/decryption module 422, which can encrypt/decrypt different keys, an access control policy module 423, which can check whether a data access request is valid or not, and a communication component 424, which can send/receive data to/from other two components (e.g., client component 410 and storage component 430) and other devices in the decentralized ledger 415 based access control component 420. A recovery module 425, can handle a case where one or more decentralized ledger based access control devices leave the system and guarantee the usability.

Storage Component.

Figure 7:
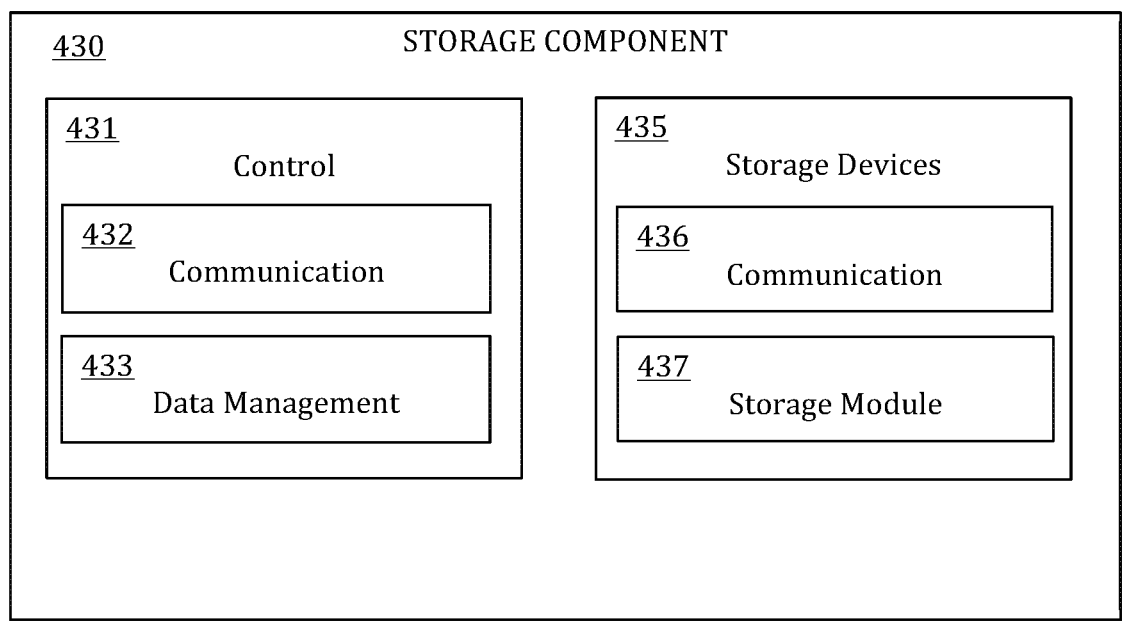
FIG. 7 illustrates a block diagram of a storage component as part of a decentralized ledger based access control system, in accordance with the embodiments.

Referring to FIG. 7, a storage component 430 can include a group of devices, which can be divided into two groups: control devices 431 and storage devices 435. A control device 431 can include a communication component 432, which can read transactions stored in the decentralized ledger 415 based access control component 420, send instructions to storage devices 435, and communicate with the client component 410. A data management component 436, can manage data storage on different storage devices 435. A storage devices 435 can also include the following components: A dedicated communication component 436, which can send/receive data from/to control device(s) 431 and client(s), and a storage module 437, which can store data according to instructions of control device(s) 431.

Initiating Data Access and Control in a Distributed Ledger Environment.

Figure 8:
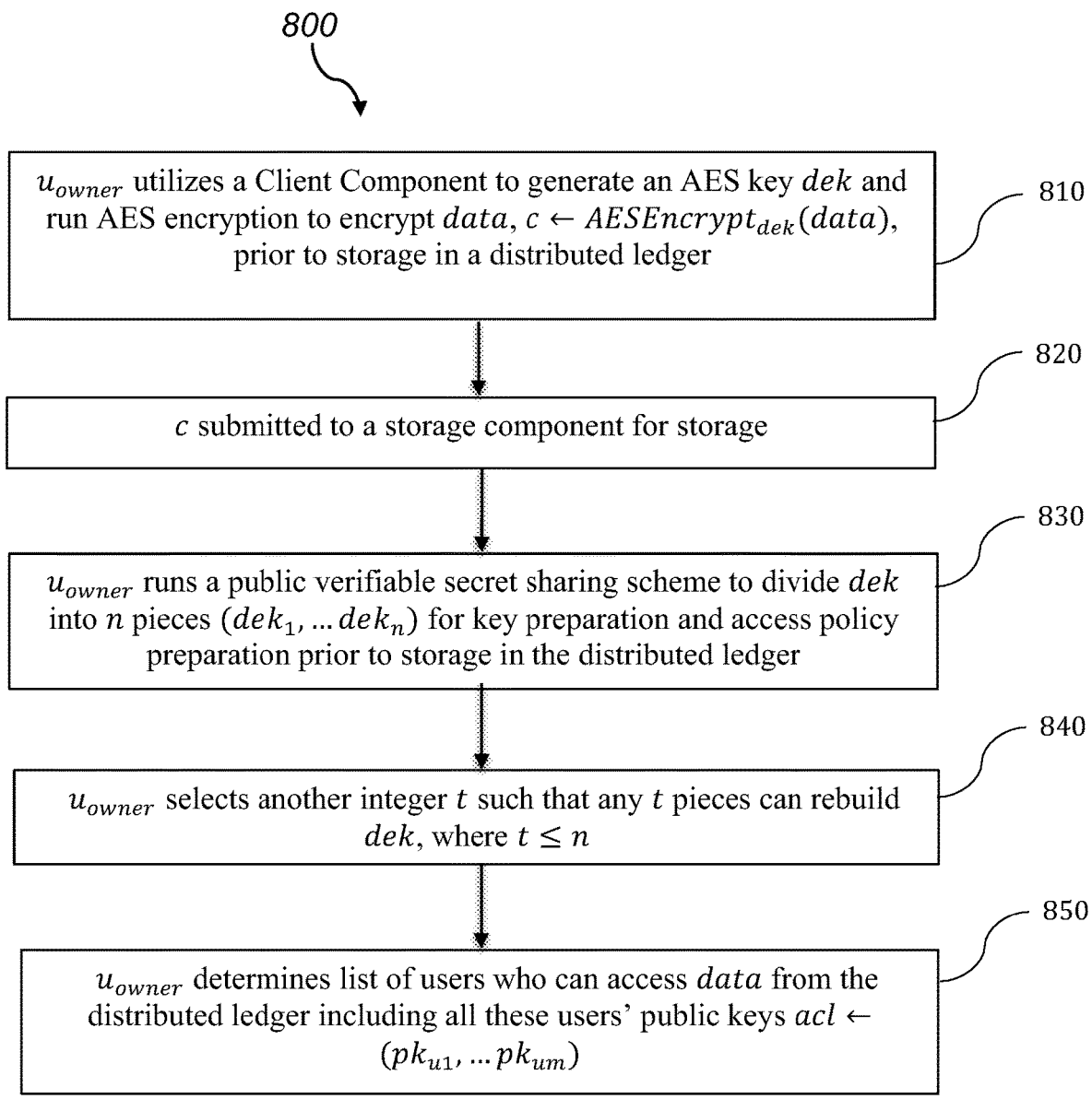
FIG. 8 illustrates a flow diagram of method steps that can be carried out in carrying out features of a decentralized ledger based access control system, in accordance with the embodiments.

Referring to the flow diagram in FIG. 8, in an exemplary embodiment where it can be assumed that there are n devices in the decentralized ledger-based access control component, and each participant is equipped with a public/private key pair. The method enables initiation of data access and control in a distributed ledger environment. Referring to Block 810, prior to uploading data, a user "$u_{owner}$" can use the Client Component to generate an AES key dek and run AES encryption to encrypt data, $c \leftarrow AESEncrypt_{dek}(data)$ prior to storage in a distributed ledger. As shown in Block 820, c can be then submitted to a storage component for storage. Then, as shown in Block 830, $u_{owner}$ can run a public verifiable secret sharing scheme to divide dek into n pieces ($dek_1, \ldots dek_n$) for key preparation and access policy preparation prior to storage in the distributed ledger. As shown in Block 840, $u_{owner}$ can then select another integer t such that any t pieces can rebuild dek, where t≤n. Then as shown in Block 550, $u_{owner}$ can determine a list of users who can access data from the distributed ledger including all these users' public keys acl←($pk_{u1}, \ldots pk_{um}$).

Access Control Information Uploading.

acl can be submitted to the Decentralized Ledger based Access Control Component and is stored on the ledger. For each device $d_i$ in the Decentralized Ledger based Access Control Component, $u_{owner}$ encrypts dek_i using $d_i$'s public key $pk_{di}$ and sends the result cipher-text to the Decentralized Ledger based Access Control Component to store in the ledger. All hash values of partial keys are also uploaded to the Decentralized Ledger based Access Control Component and stored on the ledger. These hash values are used to help to protect the integrity of partial keys, i.e., a malicious/faulty node cannot provide wrong partial keys to others.

Access Request.

A user $u_{rqst}$ can submit a request to access data to the Decentralized Ledger based Access Control Component through the Client Component. The request includes the identity of data, and a ring signature on a randomly selected public key $pk_{temp}$. The user $u_{rqst}$ can keep corresponding private key $sk_{temp}$ locally. Members that are involved in the ring signature can come from the access control list attached to data.

Access Granting.

Each $d_i$ verifies the validity of the ring signature first. If it is valid, the device $d_i$ can encrypt its share of the original AES key dek using the newly provided random public key $pk_{temp}$.

Data Accessing.

The user $u_{rqst}$ decrypts received partial key pieces using $sk_{temp}$, and leveraging hash information stored on the ledger to check whether the partial key is correct.

Recovery Mechanism.

An additional important functionality can be recovery capability. This feature can be useful when one or more devices in an Access Control Component 420 may leave the system or fail to operate. There are several approaches to support such a feature: The Client Component 410 can re-generate a new partial key and share with a new device in the Decentralized Ledger 415 via Access Control Component 420; Each partial key can further be divided into partial-partial keys and stored in the Decentralized Ledger 415 via the Access Control Component 420.

Access Control Policy Updating and Document Version Tracking.

An additional functionality that can be supported is access control policy updating. Referring to the flow diagram in FIG. 9, access control policy updating can be carried out as follows: As shown in Block 610, a new policy can be uploaded to the network by an owner. Then as shown in Block 620, nodes can mark a previous policy as being superseded by the new policy. Then as shown in Block 630, all access requests for the data can be checked with the new policy. The "append only" strategy can be used for all types of data. Therefore, version tracking is a trivial feature automatically provided by the underlying decentralized ledger.

Discovering Faulty or Malicious Nodes.

An additional functionality that can be derived and implemented in accordance with features of the embodiments is the detection of faulty nodes. This can be achieved by having the data owner generate a key proof at the time of encryption that can be used by individual nodes to verify if key fragment is correct. For documents that can be viewed by entire network the partial keys can be openly transmitted and compared against plaintext proof for verifying the contributions. Additionally the key fragment verification can be achieved if system can tolerate random exposure to a single additional node. Achieving this methodology is done via any of: distribution of key fragment proof to entire network in plaintext by owner; during key reconstruction random selection of leader peer for partial key validation without knowledge of peer and key fragment pair information it receives; by reporting of results to the network identifying pass or fail for a peer-key fragment pair to evaluate or log faulty peer behavior.

Figure 9:
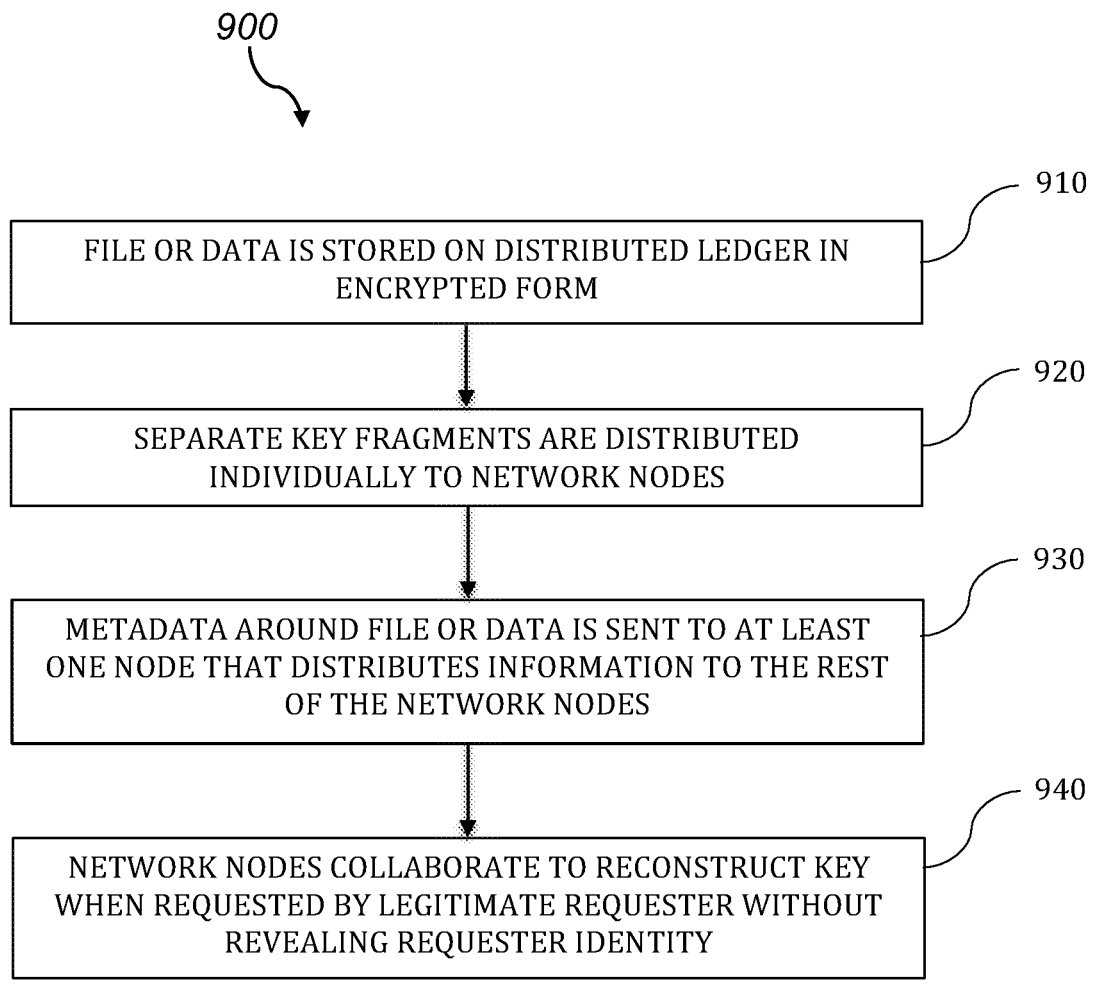
FIG. 9 illustrates another flow diagram for method steps that can be carried out in carrying out features of a decentralized ledger based access control system, in accordance with the embodiments.

To further summarize methods in accordance with the disclosed embodiments, data can be encrypted, and access control policy is decided including required number of key fragments to fulfill decryption. Access control policies can be stored in the decentralized ledger based system. Key information can be stored in the system in a decentralized manner with partial key fragments encrypted and split among system nodes. An access request can be sent to the system to fetch a data file, without disclosing the requester's identity in the system. The decentralized ledger based system can verify a legitimate request to access the data and can detect malicious/faulty attempts to access data and denies access to data by malicious or faulty participants. Referring to FIG. 9, a flow diagram of a method in accordance with the embodiments is illustrated. As shown in Block 910, a file or data can be stored on a distributed ledger in an encrypted format. Then as shown in Block 920, separate key fragments can be distributed individually to network nodes of the distributed ledger. Then referring to Block 930, Metadata around the file or data can be sent to at least one node that distributes information to the rest of the network nodes (distributed ledger). Then, as shown in Block 940, network nodes collaborate to reconstruct key when requested by legitimate requester without revealing the requester's identity.

Figure 10:
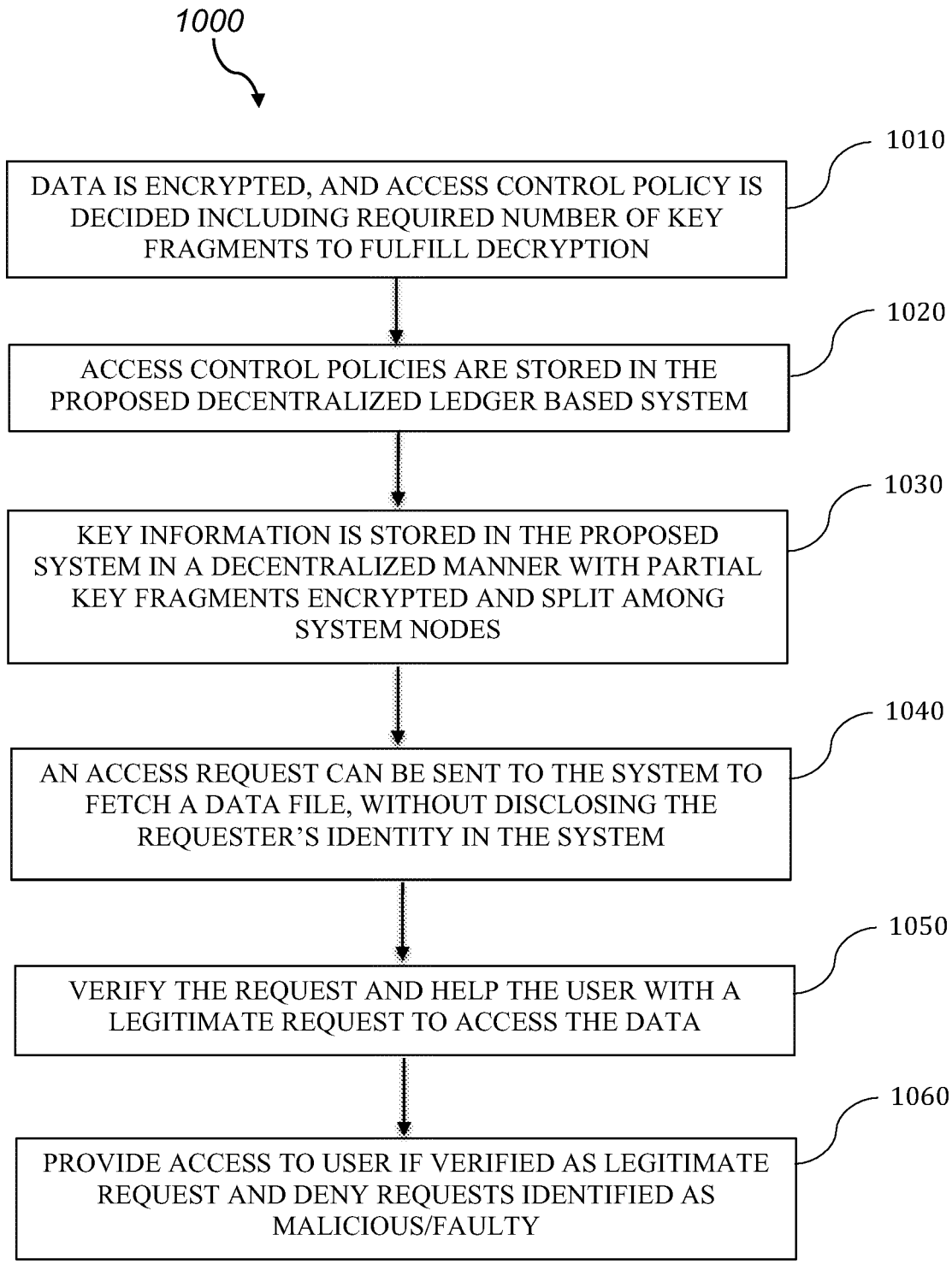
FIG. 10 illustrates yet another flow diagram for method steps that can be carried out in carrying out features of a decentralized ledger based access control system, in accordance with the embodiments.

Referring to FIG. 10, another flow diagram of a method in accordance with the embodiment is illustrated. Referring to Block 1010, data can be encrypted, and access control policy can be decided including required number of key fragments to fulfill decryption; encrypted data, access control policies are stored in the proposed decentralized ledger based system; key information is stored in the proposed system in a decentralized manner with partial key fragments encrypted and split among system nodes; an access request can be sent to the system to fetch a data file, without disclosing the requester's identity in the system. The decentralized ledger based system can verify the request and help the user with a legitimate request to access the data. In this process, malicious/faulty participants of the system can be detected. The provision of the partial keys by network nodes can be, but are ideally, signed by individual keys and can be extended to include additional established security features such as two-step authentication, biometric information, or hardware token provision.

The embodiment of the present invention provide an access control mechanism for data confidentiality protection that is completely compatible with decentralized environment, and which can be used as an independent system. An integrated to other decentralized ledger based application for access control and data protection. The embodiments provide privacy preserving. Embodiment provide user request access to data through a Client Component that does not need to disclose its identity to a Decentralized Ledger based Access Control Component. The embodiments also provide Security, where incorrect information shared by a compromised/faulty can be detected.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein can be subsequently made by those skilled in the art, which are also intended to be encompassed by the following claims.

What is claimed is:

1. A method for data access and control, comprising:
    encrypt data for distribution to a decentralized ledger comprising system nodes;
    determine access control policy that includes a required number of key fragments to fulfill decryption of the data;
    identify nodes among the systems nodes that are faulty nodes or malicious nodes;
    denying access to the nodes among the system nodes identified as faulty nodes or malicious nodes, wherein the access control policy includes the denial of the access to the nodes identified as faulty noes or malicious nodes;
    store encrypted data and access control policies in the decentralized ledger;
    split a symmetric key into partial keys including partial key fragments; and
    store key information as the partial key fragments in a decentralized manner among the system nodes including all hash values of the partial keys, the partial key fragments comprising two-step authentication, biometric information and hardware token provision; receive an access request at the distributed ledger to fetch a data file without disclosing requester identity;
    verify the access request at the decentralized ledger as a malicious/faulty request; and
    assist a user of a legitimate request to access the data and deny access to the malicious/faulty request.

2. The method for data access and control of claim 1, wherein the storage of the key information as the partial key fragments to the system nodes includes a signature of individual keys.

3. The method for data access and control of claim 1, further comprising:
    uploading all hash values of the partial key fragments to the an access control component of the decentralized ledger; and
    dividing each partial key fragment among the partial key fragments into partial-partial keys for storage in the decentralized ledger via the access control component.

* * * * *